United States Patent [19]
Stöck et al.

[11] Patent Number: 5,417,526
[45] Date of Patent: May 23, 1995

[54] HOLLOW CROWN DRILL WITH END FACE CUTTING MEMBERS

[75] Inventors: Maximilian Stöck, Azmoos, Switzerland; Ernst Wohlwend, Nendeln; William Ott, Schaan, both of Liechtenstein

[73] Assignee: Hilti Aktiengesellschaft, Fürstentum, Liechtenstein

[21] Appl. No.: 168,008

[22] Filed: Dec. 15, 1993

[30] Foreign Application Priority Data

Dec. 16, 1992 [DE] Germany ............... 42 42 465.8

[51] Int. Cl.⁶ .................................. B23B 51/04
[52] U.S. Cl. ...................... 408/204; 408/703
[58] Field of Search ............... 408/204–206, 408/703, 727

[56] References Cited

U.S. PATENT DOCUMENTS

| | | | |
|---|---|---|---|
| 3,403,526 | 3/1969 | Valenziano | 408/204 |
| 3,548,687 | 12/1970 | Holloway | 408/206 |
| 4,591,303 | 5/1986 | Sato et al. | 408/703 |
| 4,767,245 | 8/1988 | Shoji et al. | 408/204 |

FOREIGN PATENT DOCUMENTS 0009111 1/1981 Japan ................... 408/204

Primary Examiner—Steven C. Bishop
Attorney, Agent, or Firm—Anderson Kill Olick & Oshinsky

[57] ABSTRACT

A hollow crown drill has a set of cutting members (2, 3, 4) positioned on the leading or cutting end of an annular axially extending carrier member (1). The radial width of the cutting faces (2a, 3a, 4a) of the cutting members (2, 3, 4) increases opposite to the rotational direction (D) of the carrier member (1). In addition, the cutting members (3, 4) in the set disposed counter to the rotational direction (D) are offset in the direction parallel to the axis of the carrier member relative to the cutting member of the set leading in the rotational direction. This dimensional feature relates to the increase in the size of the cutting faces (2a, 3a, 4a). With the cutting faces (2a, 3a, 4a) dimensioned as above, each of the cutting members penetrates deep into the material being drilled, so that if the usual contact pressure forces are applied abrasive wear resulting in premature failure of the hollow crown drill does not occur.

5 Claims, 2 Drawing Sheets

HOLLOW CROWN DRILL WITH END FACE CUTTING MEMBERS

BACKGROUND OF THE INVENTION

The present invention is directed to a hollow crown drill with the leading or cutting end face in the drilling direction equipped with at least one set of cutting members having at least two cutting members. The cutting members of each set have cutting faces of different sizes oriented in the rotational direction of the drill and the cutting members within the set are arranged so that the cutting members increase in size counter to the rotational direction.

Hollow crown drills of the most varied constructions are used for drilling boreholes of larger diameter in structural components, such crown drills subject to purely rotational drive are specially utilized in cutting larger bores in masonry structural components. In drilling such boreholes it is necessary to provide hollow crown drills capable of operating without the use of a liquid cooling medium.

A hollow crown drill is disclosed in DE-OS 36 19 334 with a leading or cutting end face having cutting members with exposed cutting faces. In this known hollow crown drill, the cutting members are made from wear-resistant material. In addition, the cutting faces effectively carrying out the cutting operation increase in size counter to the rotational direction, whereby each cutting member being used performs its share of the chip removing operation.

While in the above-mentioned hollow crown drill wear-resistant hard material is proposed as the material for the cutting members, it was noted when drilling masonry that the cutting members using polycrystalline diamond platelets are suitable. Such diamond platelets are bonded in the hard metal basic member in polycrystalline form or as coated diamonds.

The cutting members of the above-mentioned type, however, require a sufficient penetration into the material being drilled, for instance masonry, so that no excessive wear occurs. Depending on the contact pressure applied, satisfactory penetration of the hollow crown drill must be assured, so that each cutting member participates in the drilling operation by adequate penetration into the material being drilled.

The hollow crown drill in DE-OS 36 19 334 has attachments in the above-mentioned sense. In such a drill, however, wedge-shaped cutters are used, disposed in different orientations, whereby cutting members acting as roughing cutting members remove only a portion of the material and the following cutting members effect further drilling. In this known solution, the problem is solved by identically designed though differently oriented cutters with the result that certain excess stresses develop, since in one portion of the cutting members only the tips and in another portion of the cutting members only the corners are being utilized. As a result, early wear and failure of the hollow crown drill has been experienced.

SUMMARY OF THE INVENTION

Therefore, the primary object of the present invention is to provided the hollow crown drill for dry or eccentricity-free application for assuring the long useful life at an acceptable, if necessarily manually applied, contact pressure force.

In accordance with the present invention, the radially measured width of the cutting faces of the cutting members of a set of cutting members is determined by the equation $$bi = \frac{i \times b \times k}{N}$$

The symbols in the equation represent the following:
bi—width of the one of the cutting faces in the set of cutting members,
i—the specific cutting member in the set of cutting members where the size of the cutting members increase opposite to the rotational direction,
b—the width of the cutting face of the last cutting member in the set of cutting members located counter to the rotational direction relative to the other cutting members of the set,
N—total number of the cutting members in the set of cutting members, and
k—0.7 to 1.6.

Based on the equation of the invention, the cutting faces of the cutting members within the set are arranged so that each cutting member provides an adequate portion of the drilling of the target material. Accordingly, an adequate penetration of this target material is assured, whereby abrasive wear tending to blunt the cutting members is prevented.

The equation set forth above is based upon the circumstance that the radial width of the last cutting member in a set of cutting members disposed opposite to the rotational direction is known. This means that the width of the annular gap to be drilled out of the component is known. N is the total quantity of the cutters actively participating in the drilling operation, that is, the number of cutting members in a set of cutting members with each cutting member having a different size of cutting face. If cutting members are present in addition to the set of cutting members with cutting faces corresponding to the size of an existing cutting member in a set of cutting members, this particular cutting member does not participate in the drilling of the material, instead, at most, it assists in improving the guidance of the hollow crown drill for increasing the true-to-center rotation of the tool bit. The correction factor k takes into account the deviation in the dimensioning of the width of the cutting faces in the plus or minus direction, wherein the achievement of sufficiently satisfactory results is assured.

Further to the above teaching, in which the varying sizes of the cutting faces are produced by appropriate dimensioning of their radial width, the height of the cutting faces measured parallel to the axis of the crown drill can also be varied. In the direction of the increase of the cutting faces of the cutting members in a set of cutting members, preferably the cutting member following counter to the rotational direction is offset upwardly relative to the cutting member leading in the rotational direction by a height measured parallel to the crown drill axis.

Preferably, the height measured parallel to the crown drill axis by which the cutting members are offset counter to the rotational direction is in the range of 0.1 to 1 mm.

The dimensioning of the cutting members results in that each cutting member within a set of cutting members contributes its share of drilling the annular gap to be drilled out of the structural component. Accordingly, the first or leading cutting member of a set of cutting members produces a narrow annular gap, and the gap is gradually widened by the following cutting members. This assures that each cutting member penetrates sufficiently into the material of the structural component, not only with regard to the radial width but also to the axial dimension, provided that the height or axial dimension of the cutting members is also used in a preferred way. The contact pressure force, especially because of the use of the inventive hollow crown drill in manually operated tools, must not exceed 200 Newtons, whereby the forces are distributed to all of the cutting members of a set of cutting members participating in the drilling operation.

Advantageous magnitudes with respect to the drilling output as well as to the contact pressure force to be exerted are achieved, if each set of cutting members is made up of two to five cutting members. Due to the above dimensioning of the cutting faces, each cutting member within a set of cutting members produces its share of the drilling operation. The cutting members having smaller cutting faces act as preliminary cutting members, while the last cutting member of a set of cutting members with its largest cutting face provides the finish cut of the final width of the annular gap being drilled.

While hollow crown drills can be provided with only one set of cutting members of the above type, it is also possible to provide additional sets of cutting members. Preferably, one to eight sets of cutting members are used. Preferably, the dimensioning of the cutting faces according to the present invention are used with regard to the radial width and also to the height and is applied to each set of cutters and is repeated from one set of cutters to the next. It is possible in hollow drill crowns consisting of a single set of cutters as well as several sets of cutters, to provide pure guidance members between the individual cutting members, formed of higher quality material. Such guidance members improve the concentricity and guidance of the hollow crown drill.

The various features of novelty which characterize the invention are pointed out with particularity in the claims annexed to and forming a part of this disclosure. For a better understanding of the invention, its operating advantages and specific objects attained by its use, reference should be had to the drawing and descriptive matter in which there is illustrated and described a preferred embodiment of the invention.

DETAILED DESCRIPTION OF THE INVENTION

Figure 2:
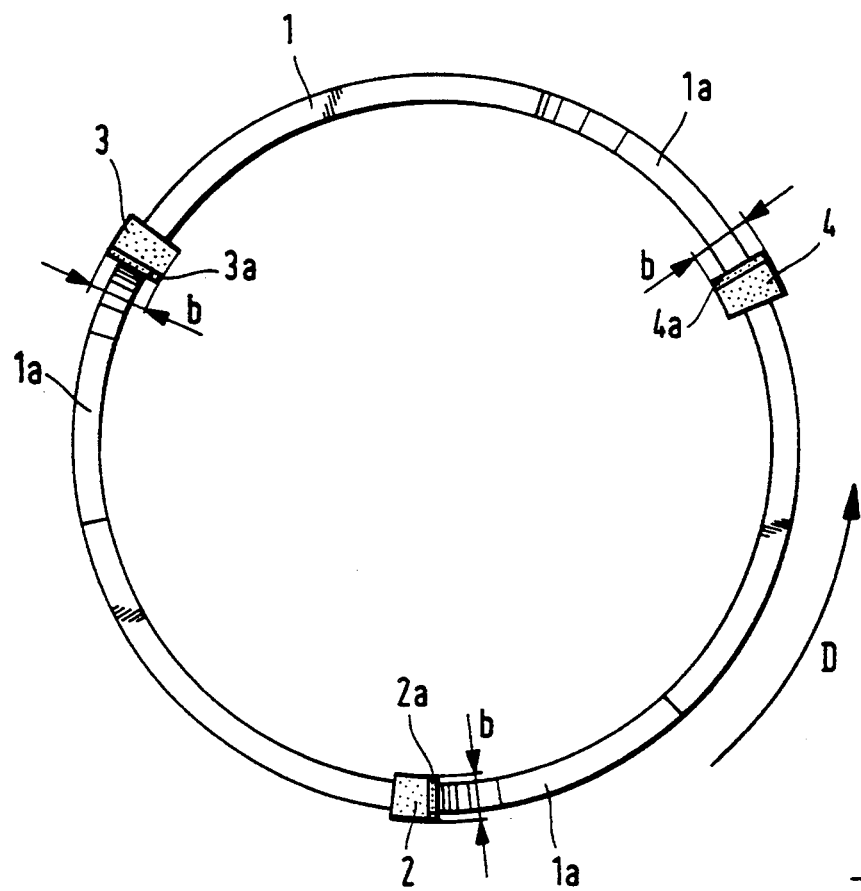
FIG. 2 is an end view of the cutting end face of the hollow crown drill illustrated in FIG. 1.
Figure 1:
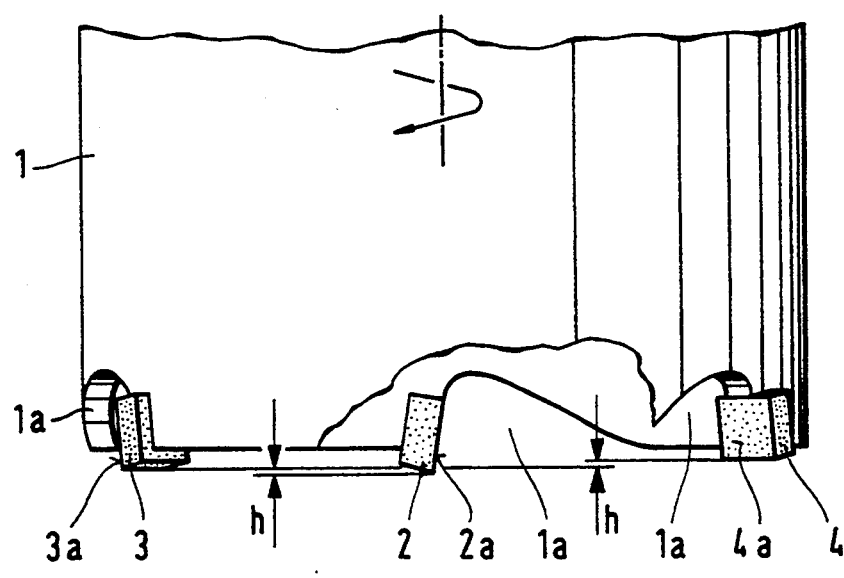
FIG. 1 is a partial elevational view showing the cutting end region of a hollow crown drill embodying the present invention with a set of cutting members in the cutting end face with the set made up of three cutting members.

In FIGS. 1 and 2 a hollow crown drill is shown with an axially extending support or carrier member 1 with three cutting members 2, 3, 4 forming a set of cutting members. The cutting members are located in the cutting end face of the carrier member 1. The cutting members 2, 3, 4 can be connected positively to the carrier member 1 or formed integrally of the same material with the carrier member. The carrier member 1 has recesses 1a in its cutting end face for exposing the cutting faces 2a, 3a, 4a of the cutting members 2, 3, 4. As shown in particular in FIG. 2, the cutting faces 2a, 3a, 4a of the cutting members 2, 3, 4 have a width b increasing counter to the rotational direction D of the serially spaced cutting members 2, 3, 4. In addition, FIG. 1 illustrates that the trailing cutting members 3, 4 following the cutting member 2 leading in the rotational direction are offset upwardly parallel to the axis of the carrier member by a height h, that is, cutting member 3 is located upwardly from cutting member 2 and cutting member 4 is located upwardly from cutting member 3.

Figure 4:
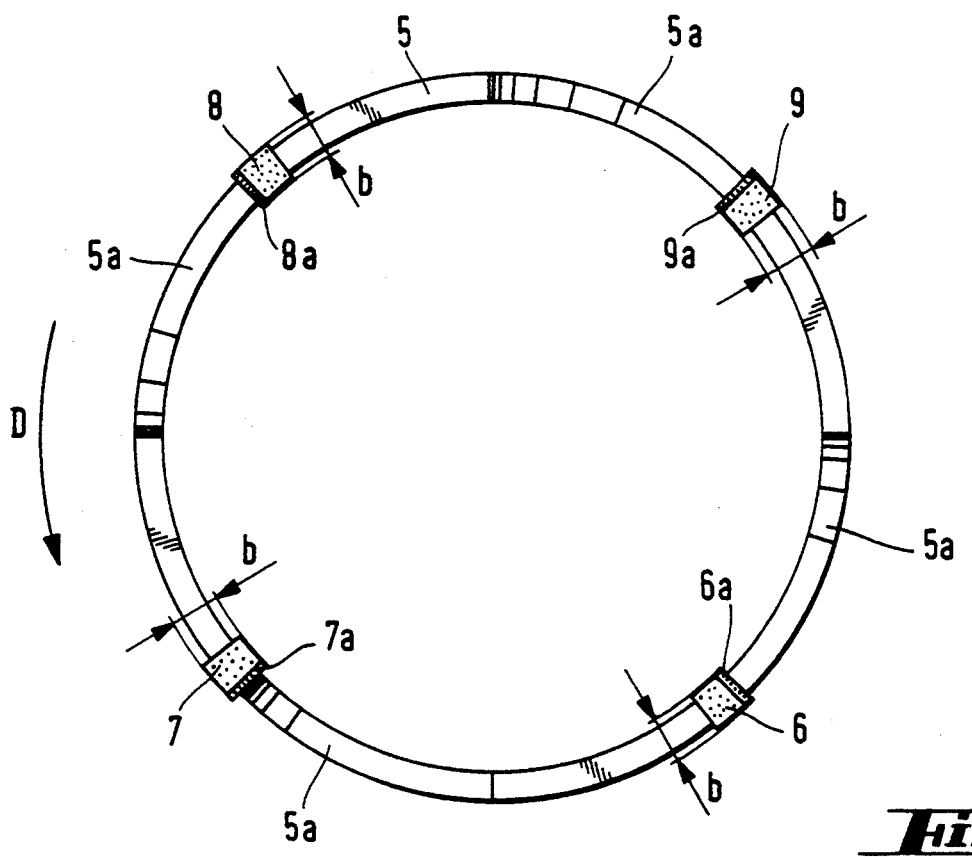
FIG. 4 is an end view of the cutting end face of the hollow crown drill displayed in FIG. 3.
Figure 3:
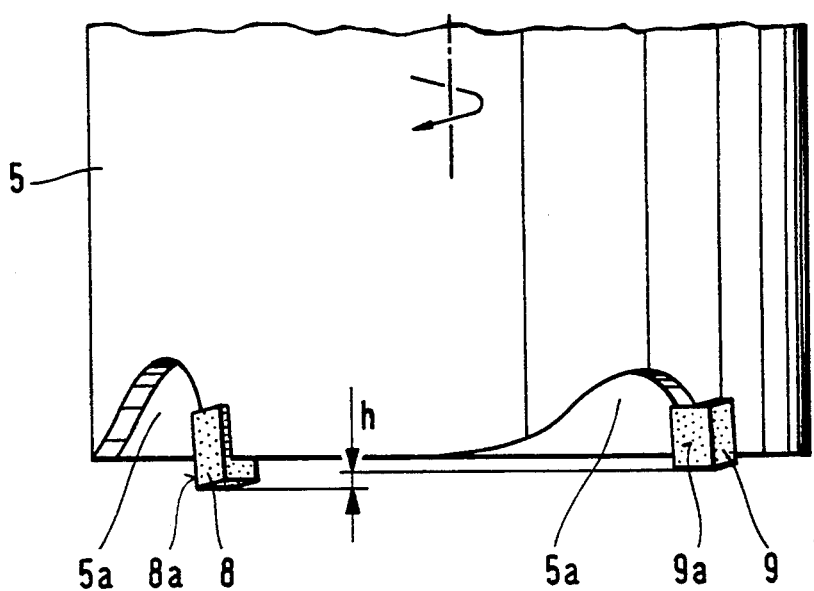
FIG. 3 is a partial elevational view of the cutting end face region of a hollow crown drill with the end face containing two sets of cutting members each having two cutting members.

In FIGS. 3 and 4, a hollow crown drill is displayed with an axially extending carrier member 5 and cutting members 6, 7, 8, 9 located in the leading cutting end face of the carrier member. As shown in FIG. 4, there are two sets of cutting members in the cutting end face with one set made up of the cutting members 6, 7 and the other set made up of the cutting members 8, 9. As can be seen in FIG. 4 the cutting members 6, 7 lead the cutting members 8, 9 in the rotational direction D.

The carrier member 5 has recesses 5a for exposing the cutting faces 6a, 7a, 8a, 9a of the cutting members 6, 7, 8, 9.

As seen best in FIG. 4, the cutting members 6, 7, 8, 9 each have a width b of the cutting faces 6a, 7a, 8a, 9a. The width b increases counter to the rotational direction D within each set of cutting members. Further, the cutting members 7, 9 following counter in the rotational direction are offset upwardly by a height h measured parallel to the axis of the crown drill with respect to the leading cutting members 6, 8, this feature is present in each set of cutting members regarding the increase of the cutting faces 7a, 9a.

While a specific embodiment of the invention has been shown and described in detail to illustrate the inventive principles, it will be understood that the invention may be embodied otherwise without departing from said principles.

We claim:

1. A hollow crown drill comprising an axially extending annular carrier member (1) having a rotational direction (D) and a leading cutting end face, at least one set of cutting members comprising at least two cutting members (2, 3, 4, 6, 7, 8, 9), said cutting members in each said set of cutting members having an exposed cutting face (2a, 3a, 4a, 6a, 7a, 8a, 9a) of a different size having a radially extending width and an axially extending height and facing in the rotational direction (D), and the cutting members (2, 3, 4, 6, 7, 8, 9) in one set of cutting members increase in size counter to the rotational direction (D), wherein the improvement comprises that the radially extending width (b) of said cutting faces (2a, 3a, 4a, 6a, 7a, 8a, 9a) of the cutting members in one set of cutting members is calculated based on the equation:

$$bi = \frac{i \times b \times k}{N}$$

wherein the symbols in the equation represent the following:
bi—radially extending width of one of said cutting faces (2a, 3a, 4a, 6a, 7a, 8a, 9a),
i—the specific one (1 to N) of the said cutting members (2, 3, 4, 6, 7, 8, 9) in one said set of cutting members increasing counter to the rotational direction (D),
b—width of the cutting face (4a, 7a, 9a) of the last cutting member of one set of cutting members located counter to the rotational direction (D),
N—total number of cutting members (2, 3, 4, 6, 7, 8, 9) in said one set of cutting members, and
k—0.7 to 1.5.

2. A hollow crown drill, as set forth in claim 1, wherein said crown drill having a drilling direction extending in the axial direction thereof, said cutting members (3, 4, 7, 9) trailing counter to the rotational direction are offset opposite to the drilling direction in a parallel manner by a height h relative to the adjacent cutting member in the set leading in the rotational direction whereby the cutting faces (2a, 3a, 4a, 6a, 7a, 8a, 9a) increase in size in said set of cutters (2, 3, 4, 6, 7, 8, 9).

3. A hollow crown drill, as set forth in claim 2, wherein said height (h) offset is in the range of 0.1 to 1 mm.

4. A hollow crown drill, as set forth in claim 1, 2 or 3, wherein said cutting members (2, 3, 4, 6, 7, 8, 9) within each said set of cutters are in the range of two to five cutting members.

5. A hollow crown drill, as set forth in claim 4, wherein said sets of cutting members on said carrier member (1) are in the range of one to eight sets of cutting members.

* * * * *